UNITED STATES PATENT OFFICE.

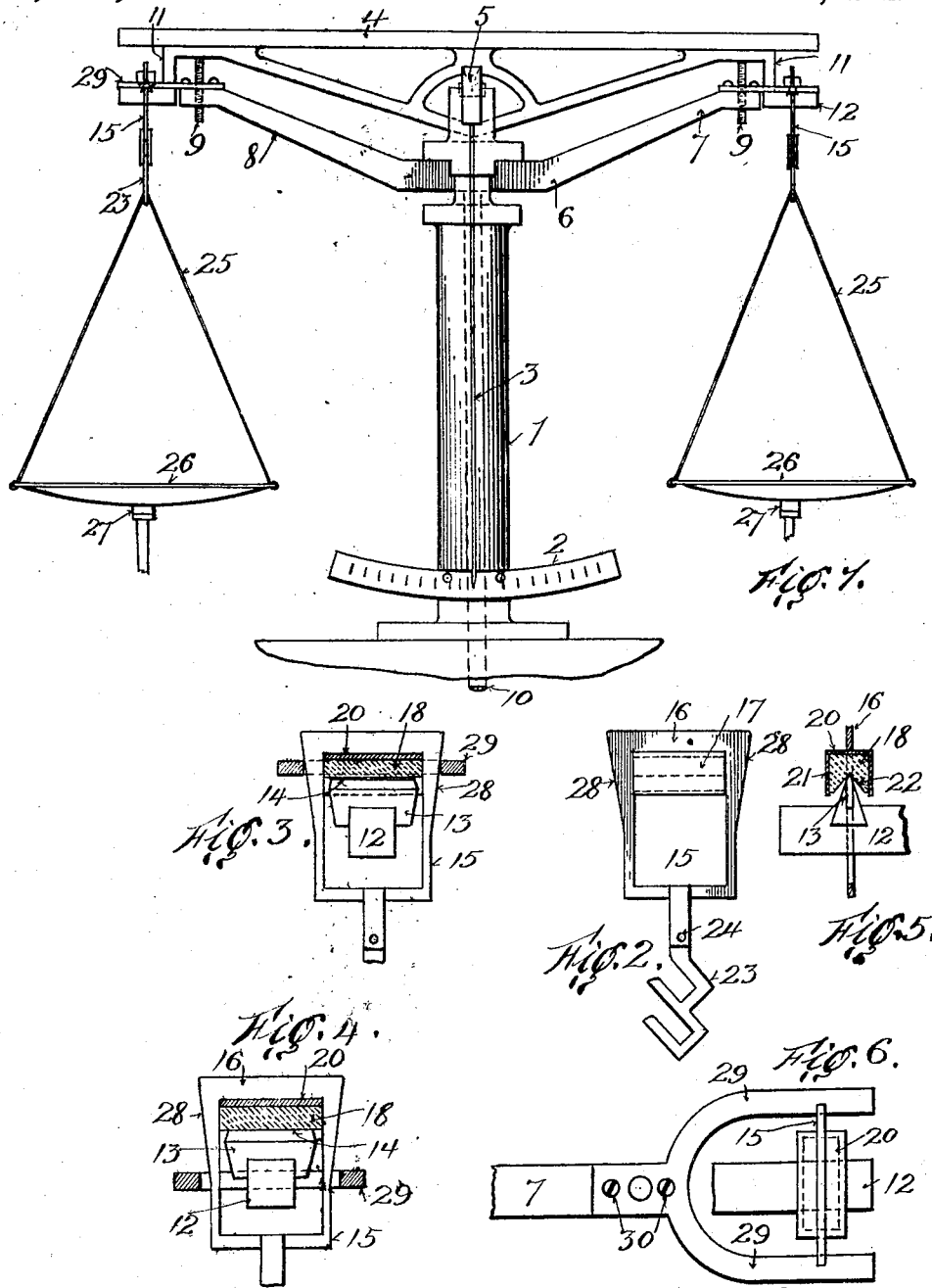

JACOB E. SEEDERER, OF NEW ROCHELLE, NEW YORK, ASSIGNOR TO SEEDERER & CO., OF NEW ROCHELLE, NEW YORK, A FIRM COMPOSED OF JOHN E. NEUMANN, ROBERT C. STROHM, JACOB E. SEEDERER.

SCALE.

1,408,038.          Specification of Letters Patent.      Patented Feb. 28, 1922.

Application filed February 24, 1921. Serial No. 447,508.

*To all whom it may concern:*

Be it known that I, JACOB E. SEEDERER, a citizen of the United States, and a resident of New Rochelle, Westchester County, and State of New York, have invented certain new and useful Improvements in Scales, of which the following is a specification.

My invention relates to scales and more particularly to precision scales such as are used in analytical and assay work and for very accurate and fine work of various kinds. The present invention relates more particularly to the stirrups which support the pans, and to their bearings and the means for centering the stirrups on their bearings.

Heretofore, where agate bearing members have been provided for the stirrups of the scales, consisting of an agate member on the stirrup having a V shaped crotch and an agate knife member on the scale beam having an edge engaging in the crotch of the agate member on the stirrup, the upper or crotch bearing has been housed in a boxlike mounting having end plates to keep the stirrup centered on the knife bearing member of the beam. The knife bearing member had but a slight lengthwise movement between these end plates as these plates served to prevent excessive end movement on the bearing knife to keep the stirrup centered on the scale beam. There are several objections to these end plates for the knife bearing, which are overcome by the present invention. One objection is, that these end plates are very expensive to make as they must be very accurately made and finished and they must be accurately mounted, in order to offer as little resistance as possible to the free swing of the stirrups. Another objection is that if one end of the knife bearing member should touch one of the end plates, as is very often the case, there is more or less frictional resistance to the free swinging of the stirrup and though this resistance would not be important in a scale for weighing heavy objects it a very important factor in a precision scale for delicate weighing where the object weighed may be a fraction of a milligram.

In the present device I employ the bearings for the stirrup consisting of the V crotch member and the knife edge member, which are usually made of agate, and in addition I employ a device for centering the stirrups on the beam, but which is disengaged from the stirrup while the weighing is actually taking place so that only the bearing members are in contact at such times and so that there is no other frictional resistance to the free movement of the stirrups and the pans which they carry. In the fullest embodiment of my invention the means for centering the stirrups are mounted upon the beam support so that when the beam is lifted the stirrups are at the same time centered and when the beam support is lowered to allow the beam to rest on its bearing, the centering device is disengaged from the stirrups to allow the latter to swing free on their bearings.

In the drawing forming part of this application,

Figure 1 is an elevation of the principal parts of a precision scale to which my invention has been applied.

Figure 2 is an elevation of one of the stirrups,

Figure 3 is a sectional view showing the fork in the act of centering the stirrup, Figure 4 is a similar view, showing the stirrup centered and the fork disengaged therefrom, Figure 5 is a cross sectional view through the stirrup showing it resting on the knife bearing, and Figure 6 is a plan view of one of the forks and one of the stirrups.

In the drawing I have shown only the principal parts of a precision scale or what is generally called an analytical scale. Such parts as are not shown may be made according to present practice. In the drawing 1 represents the tube or post on which the balancing parts are mounted and there is a scale 2 at the lower end of this post to indicate the degrees of inclination of the pointer 3 which is mounted on the beam 4. The beam 4 is mounted on a central bearing 5 the details of which it is not necessary to describe herein as this may conform to present practice. The beam support 6 is carried upon a rod 10 extending upwardly through the post 1 and this rod may be operated by the same devices commonly used for raising and lowering the beam support. The beam support 6 has arms 7, 8 extending outwardly at opposite sides from the rod 10 and these arms extend parallel with and below the opposite arms of the scale beam 4. There are adjustable screws 9 which engage the under surfaces of the beam 4 when the beam support 10 is raised so that the beam is lifted off its central bearing 5, when the scale is not in use. Just as something is about to be weighed, the beam support 6 is lowered through the operation of the rod 10 and this lowers the beam upon its central bearing and the screws 9 disengage from the beam and leave the latter to swing freely on its bearing.

The above parts are all of well known construction. The present invention relates to the stirrup device. The construction at both ends of the beam is alike so that a description of one stirrup and its associated parts will apply to both. The end of the beam turns downwardly at 11 and it extends horizontally at 12; and on the top of this horizontal portion there is mounted the bearing member for the stirrup. In this instance the bearing comprises a knife edge bearing member 13, extending crosswise of the beam and having a sharp bearing edge 14. Preferably, this member is made of agate, as it is common practice to make the bearings of agate. Each of these knife bearings supports a stirrup.

Each stirrup, as shown in the drawing, includes a rectangular frame 15 which straddles the end 12 of the beam. Just under the top bar 16 of this frame there is a socket or box 17 in which the stirrup bearing member 18 is mounted but in the present construction the end plates on this box may be omitted. The box, therefore, consists of a top plate 20 and the side plates 21 mounted or fixed in the stirrup frame 15. The bearing member 18 which is preferably of agate is mounted in this box and its under surface is provided with a V shaped crotch 22 to receive the top edge of the knife bearing 13. The stirrup frame 15 carries a depending hook 23 pivoted at 24 and on each hook there is carried a swing 25 carrying a scale pan 26.

The pans are steadied and supported up to the moment of weighing by the pan releasing arms 27 which may be operated in the same manner as in present practice.

The stirrup frame 15 is herein provided with diverging camlike edges 28 in line with the bearing member 18 and these edges are acted upon by the ends of a fork 29 which is secured by screws 30 to the end of the beam support 6. There is a fork of this type on each end of the beam support to cooperate with the respective stirrups.

Operation: When the scale is not in use the rod 10 is held in its upper position and as this holds the beam support 6 in raised position the screws 9 engage the beam and hold up the latter so that it is lifted off its center bearing 5. In this position of the beam support as shown in Figure 3, the forks 29 engage the diverging edges 28 and hold the stirrups raised sufficiently to hold the bearing members 18 slightly raised from the sharp edges of the bearing knives 13. While the forks are thus engaged with the stirrups the latter are centered crosswise of the beam. When the article to be weighed is placed in one of the pans 26 and the scale is otherwise ready for weighing, the rod 10 is lowered. This lowers the beam support 6 and also the beam 4 so that the latter rests on its bearing 5 and is, so far as the beam support is concerned, free to swing on its bearing. The beam support moves downwardly in relation to the stirrups and as they do so, they disengage from the slanting edges 28. If while the beam support is up the forks hold the stirrups with the bearing members 18 lifted off the knife bearings 13 then when the beam support goes down the bearing members 18 will come to rest on the knife bearings 13; and as the latter engages in the V shaped crotch 22 the stirrup will be centered in a direction lengthwise of the beam by the knife bearings guiding the bearing members 18. Thus any inaccuracy in the position of the stirrups lengthwise of the beam is corrected and both stirrups are properly spaced from the central bearing 5 of the beam. As the stirrups were properly centered crosswise of the beam, by the forks 29 when the latter were in raised position, when the forks descend they leave the stirrups resting on their bearings accurately centered crosswise of the beam. When the beam support is fully down the forks 29 are entirely free of the stirrups so that the only contact is between the knife bearings 13 and the bearing members 18. If the pan releasing members 27 are now lowered the pans, forks and beam will all swing free on their respective bearings.

It is sufficient for the forks 29 to position the stirrups accurately when the latter are lowered to rest on their bearings as nothing is likely to displace the stirrups laterally during the actual weighing.

When the weighing is completed the rod 10 is raised and this raises the beam support 6. The beam support raises the beam 4 slightly off its bearing 5 and serves to support it in this position until the scale is used again. When the beam support rises, the forks 29 rise in relation to the stirrups and if for any reason the latter are not properly centered laterally of the beam one end of the fork will strike one of the slanting edges 28 of the stirrup and move the stirrup crosswise of the beam until the stirrup is properly centered, ready for the next use of the scale. It is not necessary for the forks 29 to lift the stirrups off the knife bearings 13 so long as they center the stirrups but I prefer to arrange the forks so that they support the stirrups when the latter are not in use as this will prevent the stirrup bearings from wearing as a result of vibration.

It will be noted that in the present device the stirrups are accurately positioned on the beam for the weighing operation. In one direction; i. e., lengthwise of the beam, they are centered by the guiding action of the knife bearings 13 on the crotch bearing members 18; and laterally of the beam by the forks 29 acting on the diverging edges 28. But while the actual weighing takes place the forks 29 are disengaged from the stirrups so that the only friction to resist the free swing of the stirrups is that which develops between the knife bearings 13 and the bearing members 18, which is very slight. This friction is much less than where end plates are employed for the knife bearings to abut against.

Having described my invention what I claim is:—

1. In a scale the combination of a scale beam, a pan and a stirrup for supporting said pan on said beam, cooperating bearing members for said stirrup adapted to automatically center the stirrup lengthwise of the beam and comprising a knife edge bearing member on the beam and a cooperating V shaped crotch bearing member on the stirrup, said stirrup having diverging edges, and a fork adapted to act on said diverging edges to move the stirrup to center it laterally of the beam when said fork is moved in one direction, said fork being adapted to be disengaged from said stirrup after centering it, whereby the stirrup will be unrestrained in swinging on its bearing.

2. In a scale the combination of a scale beam, a movable beam support, pans and stirrups for supporting said pans on said beam, cooperating bearing members for each stirrup adapted to automatically center the stirrups lengthwise of the beam and comprising knife bearing members on the beam and cooperating V shaped crotch bearing members on the stirrups, said stirrups having diverging edges, and forks carried on said beam support and acting on the diverging edges of the stirrups to move the stirrups to center them laterally of the beam when the beam support moves upwardly, and adapted to disengage from the stirrups when the beam support is lowered, to permit the stirrups to swing unrestrained upon their bearings.

Signed at the city, county, and State of New York, this 17th day of February, 1921.

JACOB E. SEEDERER.